(12) United States Patent
Awad et al.

(10) Patent No.: US 12,021,727 B2
(45) Date of Patent: Jun. 25, 2024

(54) SYSTEMS AND METHODS FOR DYNAMIC NETWORK TRAFFIC MANIPULATION

(71) Applicant: JPMORGAN CHASE BANK, N.A., New York, NY (US)

(72) Inventors: Shaden Awad, New Providence, NJ (US); Jigar Ajay Kothari, West New York, NY (US); Suresh Thankappan, Shrewsbury, MA (US); Alan Diaz, Jersey City, NJ (US); Adeel A. Khan, Monmouth Junction, NJ (US); Julio Castillo, Sunnyside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/110,243

(22) Filed: Dec. 2, 2020

(65) Prior Publication Data

US 2021/0176155 A1    Jun. 10, 2021

Related U.S. Application Data

(60) Provisional application No. 62/945,934, filed on Dec. 10, 2019.

(51) Int. Cl.
*G06F 9/44* (2018.01)
*G06F 11/36* (2006.01)
*H04L 43/18* (2022.01)
*H04L 47/32* (2022.01)

(52) U.S. Cl.
CPC .......... *H04L 43/18* (2013.01); *G06F 11/3688* (2013.01); *H04L 47/32* (2013.01)

(58) Field of Classification Search
CPC ....................................................... H04L 43/18

USPC ........................................................ 717/127
See application file for complete search history.

(56) References Cited

U.S. PATENT DOCUMENTS

| 7,224,968 B2* | 5/2007 | Dobson | H04L 41/00 455/423 |
| 7,573,829 B2* | 8/2009 | Blair | H04L 43/50 370/244 |
| 8,352,777 B2* | 1/2013 | Shilon | H04L 43/50 370/235 |

(Continued)

*Primary Examiner* — Evral E Bodden
(74) *Attorney, Agent, or Firm* — GREENBERG TRAURIG LLP (57) ABSTRACT

Systems and methods for dynamic network traffic manipulation are disclosed. According to one embodiment, in an information processing apparatus comprising at least one computer processor and executing a computer application a method for dynamic network traffic manipulation may include: (1) receiving, at a computer application, an identification of a test to be performed on a software application under test; (2) receiving, at the computer application, a parameter for the test; (3) establishing, by the computer application, a connection between a first endpoint and a second endpoint, wherein the software application under test communicates with the first endpoint and the second endpoint using a communication channel; (4) intercepting, by the computer application, a data packet to or from the software application under test; (5) processing the intercepted data packet to apply the test with the parameter; and (6) monitoring the software application under test.

18 Claims, 5 Drawing Sheets

(56) References Cited

U.S. PATENT DOCUMENTS

| | | | | |
|---|---|---|---|---|
| 8,527,949 | B1* | 9/2013 | Pleis | G06F 15/7867 |
| | | | | 717/121 |
| 8,661,400 | B1* | 2/2014 | Ogami | G06F 1/3203 |
| | | | | 716/139 |
| 9,461,922 | B2* | 10/2016 | Mason | H04L 67/1023 |
| 9,582,391 | B2* | 2/2017 | Diperna | H04L 41/5038 |
| 9,587,913 | B2* | 3/2017 | Williams | F41H 3/02 |
| 10,015,072 | B2* | 7/2018 | Cantwell | H04L 43/50 |
| 10,288,681 | B2* | 5/2019 | Champoux | G01R 31/31908 |
| 10,601,674 | B2* | 3/2020 | Broda | H04L 41/22 |
| 11,102,081 | B1* | 8/2021 | Tiwari | G06F 11/3688 |
| 11,146,474 | B2* | 10/2021 | Koshelev | G06F 11/302 |
| 2003/0131290 | A1* | 7/2003 | Weinberg | G06F 11/3664 |
| | | | | 714/E11.208 |
| 2008/0056139 | A1* | 3/2008 | Liaqat | H04L 43/00 |
| | | | | 370/242 |
| 2012/0047492 | A1* | 2/2012 | Huang | G06F 8/60 |
| | | | | 717/128 |
| 2016/0034381 | A1* | 2/2016 | Keret | G06F 11/3668 |
| | | | | 717/124 |
| 2019/0050324 | A1* | 2/2019 | Ellis | G06F 30/00 |
| 2019/0182132 | A1* | 6/2019 | Gupta | G06F 16/173 |

* cited by examiner

SYSTEMS AND METHODS FOR DYNAMIC NETWORK TRAFFIC MANIPULATION

RELATED APPLICATIONS

This application claims priority to U.S. Provisional Patent Application Ser. No. 62/945,934, filed Dec. 10, 2019, the disclosure of which is hereby incorporated, by reference, in its entirety.

BACKGROUND OF THE INVENTION

1. Field of the Invention

Embodiments generally relate to testing and debugging software applications that communicate over a network, and, more particularly, to systems and methods for dynamic network traffic manipulation.

2. Description of the Related Art

Software applications communicate over a network or through different computing layers to remote components. These communications may be implemented as data packets that are transmitted and routed through a network. When developing a software application, errors, defects, or irregularities in the way data packets are routed may affect the user's experience as the user executes the software application. Network simulation appliances or software has not been easily accessible to developers, testers, or architects due to high acquisition costs, complex setup requirements, etc.

SUMMARY OF THE INVENTION

Systems and methods for dynamic network traffic manipulation are disclosed. According to one embodiment, in an information processing apparatus comprising at least one computer processor and executing a computer application a method for dynamic network traffic manipulation may include: (1) receiving, at a computer application, an identification of a test to be performed on a software application under test; (2) receiving, at the computer application, a parameter for the test; (3) establishing, by the computer application, a connection between a first endpoint and a second endpoint, wherein the software application under test communicates with the first endpoint and the second endpoint using a communication channel; (4) intercepting, by the computer application, a data packet to or from the software application under test; (5) processing the intercepted data packet to apply the test with the parameter; and (6) monitoring the software application under test.

In one embodiment, the test may correspond to an operation that induces an error, adds latency, blocks a communication, steals a route, or eaves drops on a communication to or from the software application under test. In another embodiment, the test may correspond to an operation affects data integrity or implements rule-based traffic filtering for the software application under test.

In one embodiment, the test may be received at a user interface.

In one embodiment, the test parameter may include a duration of latency, a rule for packet filtering, a port, a flag, a payload, a Media Access Control (MAC) address, a version, am identification, a protocol type, a Transmission Control Protocol (TCP) option, a TTL, a checksum, a source or destination Internet Protocol (IP) address, etc.

In one embodiment, the intercepted data packet may be processed to induce a delay, reroute the data packet, or stress to the communication channel, to modify a payload of the intercepted data packet, to modify a checksum, a flag setting, a destination port or an IP address for the intercepted data packet, etc.

In one embodiment, the software application under test may be monitored for a change in a perceived user experience over a period of time.

In one embodiment, the method may further include automatically executing an action in response to the monitoring of the software application under test, wherein the action may include allocating a system resource to the software application under test.

According to another embodiment, a system for dynamic network traffic manipulation may include an electronic device comprising at least one computer processor executing a software application under test, the software application under test communicating with a first endpoint and a second endpoint; a test database comprising a plurality of tests; a parameters database comprising a plurality of parameters for the tests; a user interface that receives a selection of one of the plurality of tests to execute on the software application under test and an identification of at least one of the parameters for the test; and a testing computer application the executes the test. The computer application may receive the at least one parameter for the test; may establish a connection between the first endpoint and the second endpoint; may intercept a data packet to or from the software application under test; may process the intercepted data packet to apply the test with the parameter; and may monitor the software application under test.

In one embodiment, the test may correspond to an operation that induces an error, adds latency, blocks a communication, steals a route, or eaves drops on a communication to or from the software application under test.

In one embodiment, the test may correspond to an operation affects data integrity or implements rule-based traffic filtering for the software application under test.

In one embodiment, the test may be received at a user interface.

In one embodiment, the test parameter may include a duration of latency, a rule for packet filtering, a port, a flag, a payload, a MAC address, a version, am identification, a protocol type, a TCP option, a TTL, a checksum, a source or destination IP address, etc.

In one embodiment, the intercepted data packet may be processed to induce a delay, reroute the data packet, or stress to the communication channel, to modify a payload of the intercepted data packet, to modify a checksum, a flag setting, a destination port or an IP address for the intercepted data packet, etc.

In one embodiment, the software application under test may be monitored for a change in a perceived user experience over a period of time.

In one embodiment, the computer application may automatically execute an action in response to the monitoring of the software application under test, wherein the action may include allocating a system resource to the software application under test.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for dynamic network traffic manipulation. In embodiments, a Dynamic Network Traffic Manipulation (DNTM) application, which may be a tool to assist software developers in simulating problems with routing data through a network, is disclosed. The DNTM application may be implemented as a relative small application that may be installed between two endpoints on either side of a network. It may be embedded into an application by developers as a dynamically linked library or statically linked library. The DNTM application may intercept communication between the end points, modify the communication according to one or more test conditions and forward the communication accordingly. A developer of a software application may observe the effects of the applied tests to see how they influence the execution of the software application. In addition, data metrics captured during testing and development cycles may be fed into an Artificial Intelligence (AI)/Machine Learning (ML) engine to understand application performance and behavior in real world situations.

According to embodiments, the DNTM application may comprise a user interface such as, for example, a command line or a graphic user interface. The user interface allows the developer to select one or more tests and parameters for the tests. The user interface allows the developer to then execute a software application under test so that communication with remote end points are intercepted by the DNTM and processed according to the tests or forwarded to an analytics engine.

Embodiments are described with respect to the figures. It is understood that the figures provide examples of ways to implement embodiments of the present disclosure and are therefore not limiting.

Figure 1:
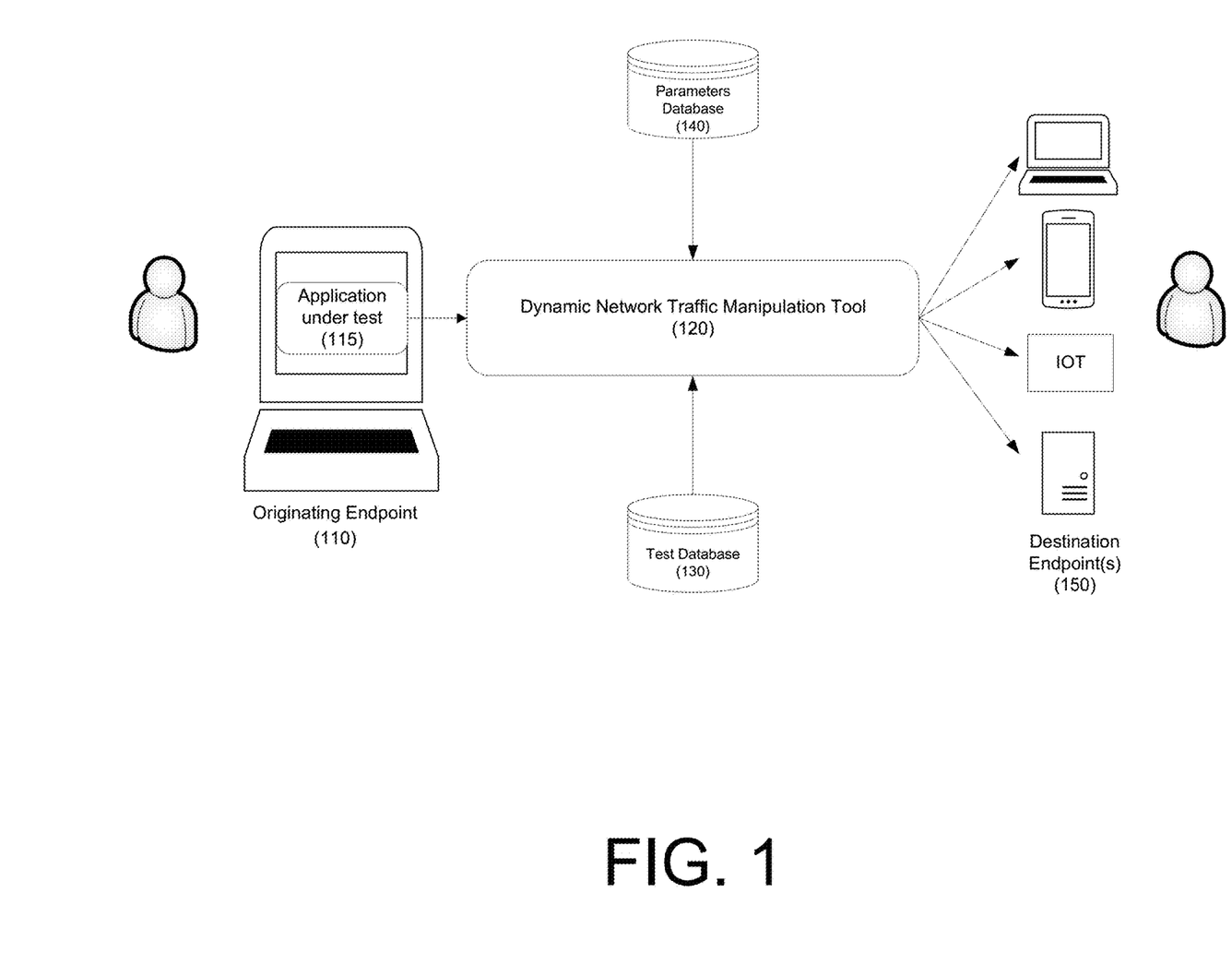
FIG. 1 depicts a system for dynamic network traffic manipulation according to one embodiment.

FIG. 1 depicts a system for dynamic network traffic manipulation according to embodiments. System 100 may include DNTM application 120. DNTM application 120 may be a simple network traffic interceptor and packet manipulator that may be used by development teams to simulate network conditions when developing network sensitive applications, such as, for example, communication clients. Using DNTM application 120, developers may be able to introduce packet delays, various type of errors, drops, discards, filters, etc. while testing their applications. DNTM application 120 may be installed on various endpoints or intermediate nodes. DNTM application 120 may also be embedded in another application itself. For example, an application that performs network or protocol filtering in parental control products may be embedded with DNTM application 120. In addition, DNTM application 120 has a simple user interface or command line functionality to setup various use cases.

DNTM application 120 may work with the individual packets being passed in between networks and multi-vendor applications. After a user has developed software application 115 and wishes to test it, the user may be able to work with a GUI or command line of DNTM application 120 to allow the user to induce delay, error, or dropping of packets. Additionally, the user may be able to enter the frequency at which each type of vulnerability occurs, as well as induce several vulnerabilities at the same time. In addition, a frequency functionality uses the capabilities of a random number generator to spread out which packets are manipulated and which aren't to further simulate what network error would look like in a real environment.

Once running, DNTM application 120 may reside between application under test 115 on originating endpoint 110 and one or more destination endpoint 150 so that it intercepts packets, and induces an error. Additionally, in real time, DNTM application 120 may display via a user interface, the packets passing through DNTM application 120 as well as the type of vulnerability, stress, test, or packet processing procedure, if any, was introduced.

Examples of endpoints 120, 150 include applications, browsers, devices, network nodes, etc. In addition, DNTM application 120 may be inserted between open system interconnect (OSI) layers of a device.

In one embodiment, a plurality of destination endpoints 150 may receive data from the originating endpoint. For example, originating endpoint may broadcast data (e.g., audio, video, combinations) to a plurality of destination endpoints (e.g., smartphones, computers, Internet of Things (IoT) devices, etc.).

Test database 130 may include one or more test that may be induced on intercepted packets. For example, test database 130 may include tests that correspond to an operation that processes a packet or other communication such as, for example, a process to induce an error, latency, blocking, route stealing, or eaves dropping. The test may affect the data integrity or implement rule-based traffic filtering. The test may also perform packet injection. A test selected test may be received by DNTM application 120 via a user interface.

In embodiments, the tests may be used to find a threshold for poor connectivity, which may be relevant to voice and video traffic.

Other tests and different tests may be included as is necessary and/or desired.

Parameters database 140 may include parameters that may be selected and specified by a user that may be configuring one or more test. Examples of parameters a duration of latency, or rule(s) for packet filtering, introducing packet error(s), retransmission, checksum error(s), out of order packets, or a random number generator to randomly apply the test for real world simulation according to a specified frequency, a port, a flag setting, a payload, a Media Access Control (MAC) address, a version field, an identification field, a protocol type, a Transmission Control Protocol (TCP) option, a Time-To-Live (TTL), a checksum, and/or a source/destination Internet Protocol (IP) address. In embodiments, manipulation of one or more of these parameters may be based on the test that is selected. Other parameters may be used as is necessary/or desired.

In embodiments, parameters of intercepted traffic flow may be displayed in real-time in a Graphical User Interface (GUI) while executing DNTM application 120.

In embodiments, DNTM application 120 may be configured to intercept packets at the different OSI layers, allowing it to manipulate at the MAC, IP, Port/Protocol levels. In embodiments, DNTM application 120 may have a small footprint so that it may be installed in a variety of machines. In embodiments, DNTM application 120 may be installed in a secure proxy or router to perform network traffic monitoring, white listing, black listing, blocking and auditing networking traffic like the inter or intranet traffic, or restricting certain type of traffic (e.g., Simple Mail Transfer Protocol (SMTP), File Transfer Protocol (FTP), Hypertext Transfer Protocol (HTTP), etc.). Furthermore, DNTM application 120 may be used for scheduled blocking or throttling of network traffic during certain hours of the day; this capability would particularly useful for parental controls and in schools, where certain web traffic may be blocked during off-hours.

Figure 2A:
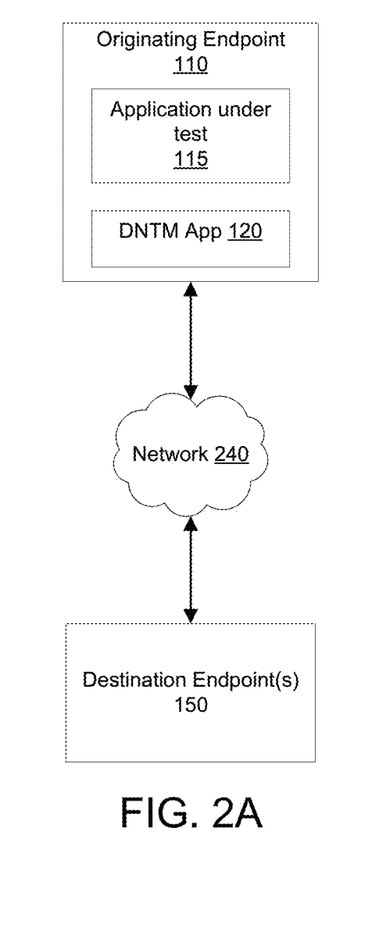
FIGS. 2A to 2D illustrate various examples of implementing a DNTM application according to embodiments.

FIGS. 2A-2D illustrate various examples of implementing DNTM application 120. In FIG. 2A, DNTM application 120 may be installed on originating endpoint 110 with application under test 115.

Figure 2B:
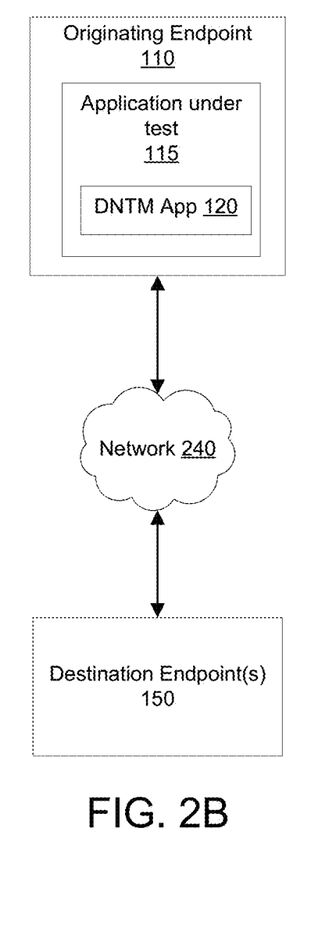

In FIG. 2B, DNTM application 120 may be incorporated into application under test 115 on originating endpoint 110. For example, DNTM application 120 may be a library.

Figure 2C:
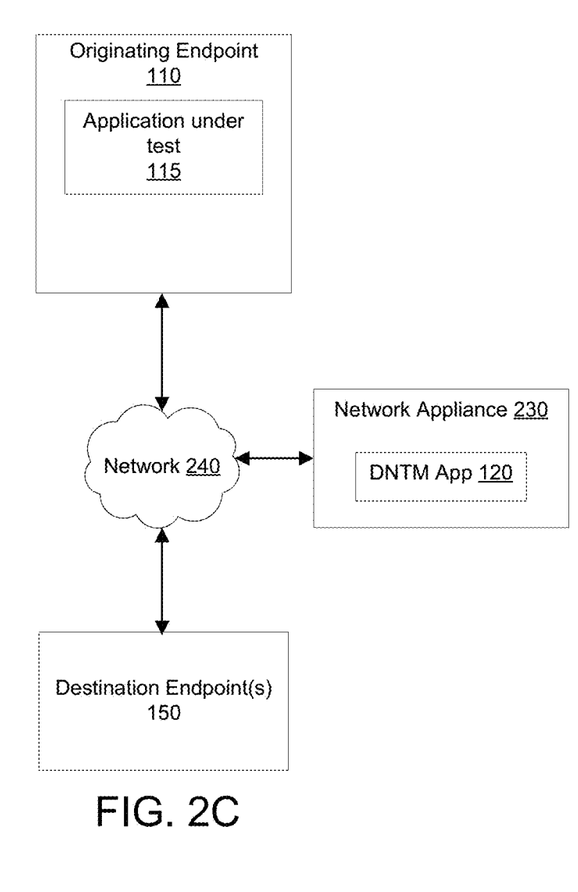

In FIG. 2C, DNTM application 110 may be installed in a network appliance 230 that may be separate from originating endpoint 110 and destination endpoint(s) 150. Network appliance 230 may be a proxy server, home router, hub, edge server, or other intermediate node capable of intercepting network traffic between originating endpoint 110 and destination endpoint(s) 150.

Figure 2D:
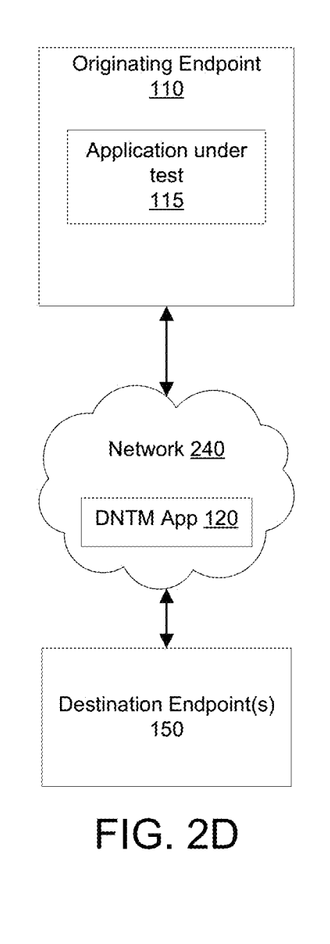

In FIG. 2D, DNTM application 120 may be installed in network 240 as, for example, a cloud service.

Figure 3:
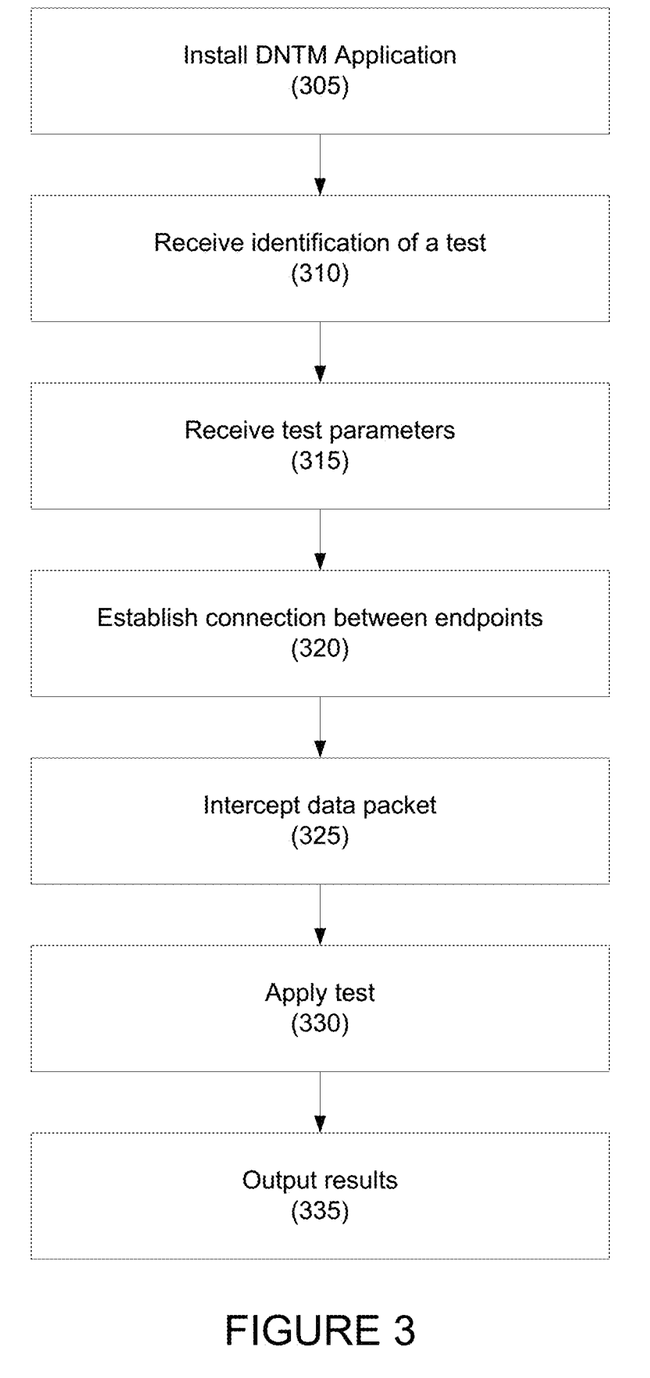
FIG. 3 depicts a method for dynamic network traffic manipulation according to one embodiment.

FIG. 3 depicts a method for dynamic network traffic manipulation according to one embodiment. It is understood that FIG. 3 provides an example of the many different types of functional arrangements that may be employed to implement the operation of the portion of the DNTM application as described herein. FIG. 3 may also be viewed as depicting an example of elements of a method implemented in a client device, server, or network appliance, etc. according to one or more embodiments.

In step 305, a DNTM application may execute an installation process so that it may be installed in a computing device. Upon installation, the DNTM application may be granted access to communication over a network or in between OSI layers of the computing device.

In one embodiment, the DNTM application may be installed on the same computing device on which an application under test is executed, it may be integrated within the application under test using a shared library (e.g., statically or dynamically linked), it may be provided in the cloud as a service, or it may be provided on a network appliance.

In step 310, the DNTM application may receive an identification of a test to be performed on the software application under test. The test may correspond to an operation that processes a packet or other communication such as, for example, a process to induce an error, latency, blocking, route stealing, or eaves dropping. The test may affect the data integrity or implement rule-based traffic filtering. The test may also perform packet injection. A test selected test may be received by the DNTM application via a user interface.

In step 315, the DNTM application may receive one or more test parameters for the test. The test parameters may be used to define the scope of the test. The test parameters may specify a duration of latency, or rule for packet filtering, or a random number generator to randomly apply the test for real world simulation according to a specified frequency. The test parameters may also specify a port, a flag setting, a payload, a MAC address, a version, an identification field, a protocol type, a TCP option, a TTL, a checksum, and/or a source/destination IP address.

Once the test and parameters are defined, the DNTM application may proceed to a runtime mode. In step 320, the DNTM application establishes a connection between the originating endpoint and the destination endpoint(s). In this respect, the DNTM application may route received packets from a source to one or more destinations.

In step 325, the DNTM application may intercept data packets between the application under test and one or more destination endpoints. In step 330, the DNTM application may apply the test. For example, the DNTM application may process a received data packet by manipulating field values in the data packet, induce a delay, reroute the data packet, or otherwise cause stress to the communication channel. In some embodiments, the DNTM application may apply the test on a subset of data packets that are intercepted. The subset may be determined arbitrarily using a random number generator or determined according to a processing rule.

The DNTM application may display the testing operations applied to the data packets in a user interface. The display may be in real time so that a user may observe how data packets are being handled by the DNTM application.

In some embodiments, the endpoint may comprise a plurality of devices such that the endpoints perform load balancing.

In some embodiments, the DNTM application may present a user interface to allow a user to start and stop inducing network delay while the software application under test may be executing. In this respect, the software application under test operates independently from the DNTM application. In other embodiments, the DNTM application may present a user interface to allow a user to adjust the tests and test parameters dynamically in real time while the software under test may be executing.

In further embodiments, the test may be configured to modify the payload of the packet as well as packet values such as, for example checksum, flag setting, as well as the destination port and IP address to re-route packets.

In embodiments, one or more monitors may look for change in the parameters and identify the impact, if any, on a perceived user experience over a period of time.

In step 335, the DNTM application may output results in, for example, a user interface, a centralized monitoring framework, data analytics systems, etc. In one embodiment, automated action such as assigning packet Quality of Service (QoS), allocating system resources on demand, alerting admin or support personnel, assisting in system failovers, etc. may be taken as is necessary and/or desired.

In one embodiment, the results may be used to train a machine learning model. For example, the time of day, day of the week/month, time of year, type of data packets, external events, etc. may be inputs to train a machine learning model that may be used to predict network events given a set of circumstances.

In one embodiment, using the machine learning model, an automated action may be taken, such as deploying additional compute resources, applying QoS for interested packets, alerting admins or support personal, forecasting, etc.

Figure 4:
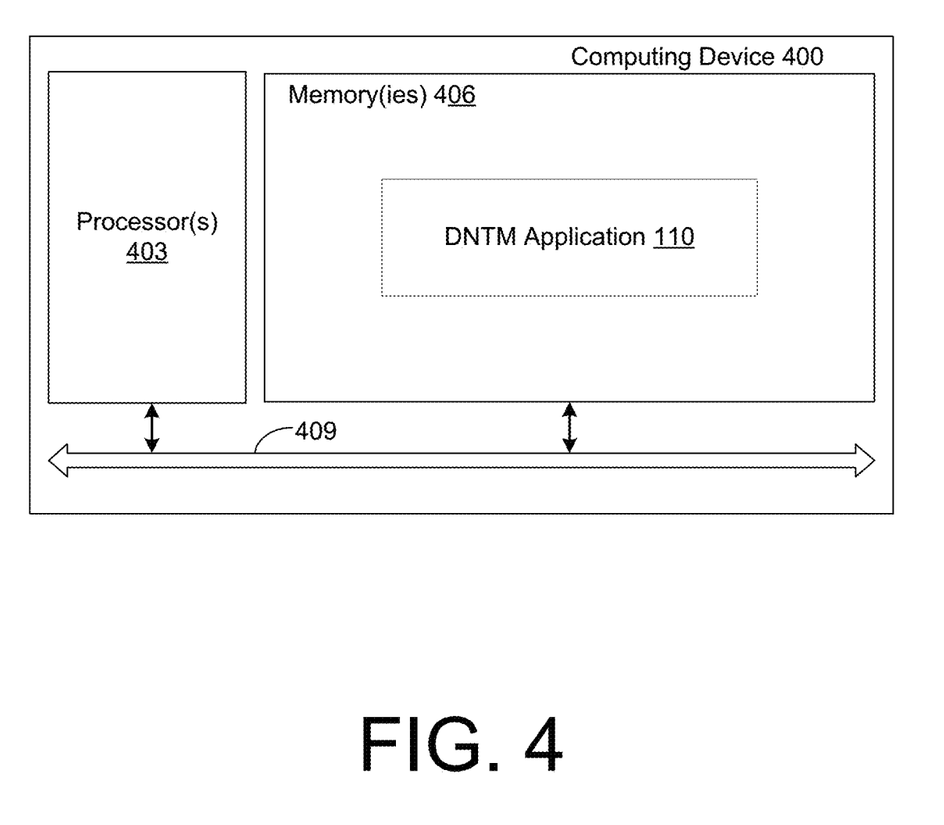
FIG. 4 depicts a schematic block diagram of an exemplary computing device according to one embodiment.

FIG. 4 is a schematic block diagram of an example of computing device 400. Computing device 400 may be a client device, a server, a network appliance, etc. Computing device 500 may include at least one processor circuit, for example a processor 403, and memory 406, both of which may be coupled to a local interface 409 or bus. Local interface 409 may comprise a data bus with an accompanying address/control bus or other bus structure.

Data and several components may be stored in memory 406. The data and several components may be accessed and/or executable by the processor 403. DNTM application 110 may be stored in memory 406 and executed by processor 403. Other applications may be stored in memory 406 and may be executable by processor 403 such as, for example, the software application under test. Any component discussed herein may be implemented in the form of software, any one of a number of programming languages may be employed, for example, C, C++, C #, Objective C, Java®, JavaScript®, Perl, PHP, Visual Basic®, Python®, Ruby, or other programming languages.

Several software components may be stored in memory 406 and may be executable by processor 403. The term "executable" may be described as a program file that may be in a form that may ultimately be run by processor 403. Examples of executable programs may be, a compiled program that may be translated into machine code in a format that may be loaded into a random access portion of memory 406 and run by processor 403, source code that may be expressed in proper format such as object code that may be capable of being loaded into a random access portion of memory 406 and executed by processor 403, or source code that may be interpreted by another executable program to generate instructions in a random access portion of memory 406 to be executed by processor 403, and the like. An executable program may be stored in any portion or component of memory 406, for example, random access memory (RAM), read-only memory (ROM), hard drive, solid-state drive, USB flash drive, memory card, optical disc such as compact disc (CD) or digital versatile disc (DVD), floppy disk, magnetic tape, or any other memory components.

Memory 406 may be defined as including both volatile and nonvolatile memory and data storage components. Volatile components may be those that do not retain data values upon loss of power. Nonvolatile components may be those that retain data upon a loss of power. Memory 406 may comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. Embodiments, RANI may comprise static random-access memory (SRAM), dynamic random access memory (DRAM), or magnetic random access memory (MRAM) and other such devices. Embodiments, ROM may comprise a programmable read-only memory (PROM), an erasable programmable read-only memory (EPROM), an electrically erasable programmable read-only memory (EEPROM), or other like memory device.

Processor 403 may represent multiple processors 403 and/or multiple processor cores and memory 406 may represent multiple memories 406 that may operate in parallel processing circuits, respectively. Local interface 409 may be an appropriate network that facilitates communication between any two of the multiple processors 403, between any processor 403 and any of memories 406, or between any two of the memories 406, and the like. Local interface 409 may comprise additional systems designed to coordinate this communication, for example, performing load balancing. Processor 403 may be of electrical or other available construction.

Memory 406 stores various software programs, such as DNTM application 110. These software programs may be embodied in software or code executed by hardware as discussed above, as an alternative the same may also be embodied in dedicated hardware or a combination of software/hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, and the like. Technologies may generally be well known by those skilled in the art and, consequently, are not described in detail herein.

The operations described herein may be implemented as software stored in computer-readable medium. Computer-readable medium may comprise many physical media, for example, magnetic, optical, or semiconductor media. Examples of a suitable computer-readable medium may include, but are not limited to, magnetic tapes, magnetic floppy diskettes, magnetic hard drives, memory cards, solid-state drives, USB flash drives, or optical discs. Embodiments, computer-readable medium may be a random-access memory (RAM), for example, static random-access memory (SRAM) and dynamic random access memory (DRAM), or magnetic random access memory (MRAM). Computer-readable medium may be a read-only memory (ROM), a programmable read-only memory (PROM), an erasable programmable read-only memory (EPROM), an electrically erasable programmable read-only memory (EEPROM), or other type of memory device.

Any logic or application described herein, including the DNTM application 110 may be implemented and structured in a variety of ways. One or more applications described may be implemented as modules or components of a single application. One or more applications described herein may be executed in shared or separate computing devices or a combination thereof. For example, the software application described herein may execute in the same computing device 400, or in multiple computing devices. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is understood with the context as used in general to present that an item, term, and the like, may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure.

What is claimed is:

1. A method for dynamic network traffic manipulation, comprising:
   in an information processing apparatus comprising at least one computer processor and executing a computer application:
   receiving an identification of a test to be performed on a software application under test;
   receiving a first test parameter for the test from a user interface;

establishing, by the computer application, a connection between a first endpoint and a second endpoint, wherein the software application under test communicates with the first endpoint and the second endpoint using a communication channel that communicates a data packet;

intercepting the data packet to or from the software application under test;

modifying the intercepted data packet with the first test parameter, wherein the first test parameter affects a data integrity of data in the intercepted data packet or rules-based traffic filtering of the intercepted data packet;

receiving a second test parameter for the test from the user interface;

dynamically adjusting the test in real-time based on the second test parameter while the software application continues executing;

modifying the intercepted data packet with the second test parameter, wherein the second test parameter further affects the data integrity of data in the intercepted data packet or rules-based traffic filtering of the intercepted data packet;

forwarding the modified data packet on the communication channel to the software application; and monitoring the software application under test based on the modified data packet.

2. The method of claim 1, wherein the test corresponds to an operation that induces an error, adds latency, blocks a communication, steals a route, or eaves drops on a communication to or from the software application under test.

3. The method of claim 1, wherein the test is received at a user interface.

4. The method of claim 1, wherein the first test parameter and the second test parameter include at least one of a duration of latency, a rule for packet filtering, a port, a flag, a payload, a Medial Access Control (MAC) address, a version, an identification, a protocol type, a Transmission Control Protocol (TCP) option, a Time-To-Live (TTL), a checksum, and a source or destination Internet Protocol (IP) address.

5. The method of claim 1, wherein the data packet is processed to induce a delay, reroute the data packet, or stress to the communication channel.

6. The method of claim 1, wherein the data packet is processed to modify a payload of the data packet.

7. The method of claim 1, wherein the data packet is processed to modify a checksum, a flag setting, a destination port or an IP address for the data packet.

8. The method of claim 1, wherein the software application under test is monitored for a change in a perceived user experience over a period of time.

9. The method of claim 1, further comprising:

automatically executing an action in response to the monitoring of the software application under test, wherein the action may include allocating a system resource to the software application under test.

10. A system for dynamic network traffic manipulation, comprising:

an electronic device comprising at least one computer processor executing a software application under test, the software application under test communicating with a first endpoint and a second endpoint using a communication channel;

a test database comprising a plurality of tests;

a parameters database comprising a plurality of test parameters for the tests;

a user interface that receives a selection of one of the plurality of tests to execute on the software application under test, a first test parameter of the plurality of test parameters for the test, and a second test parameter of the plurality of test parameters for the test; and a testing computer application that executes the test; wherein:

the testing computer application receives the first test parameter for the test prior to the execution of the test;

the testing computer application establishes a connection between the first endpoint and the second endpoint using the communication channel that communicates a data packet;

the testing computer application intercepts the data packet to or from the software application under test;

the testing computer application modifies the intercepted data packet with the first test parameter, wherein the first test parameter affects a data integrity of data in the data packet or rules-based traffic filtering of the data packet;

the testing computer receives the second test parameter for the test during execution of the test;

the testing computer dynamically adjusts the test in real-time based on the second test parameter while the software application continues executing;

the testing computer modifies the intercepted data packet based on the second test parameter, wherein the second test parameter further affects the data integrity of data in the intercepted data packet or rules-based traffic filtering of the intercepted data packet;

the testing computer application forwards the modified data packet on the communication channel to the software application; and the testing computer application monitors the software application under test.

11. The system of claim 10, wherein the test corresponds to an operation that induces an error, adds latency, blocks a communication, steals a route, or eaves drops on a communication to or from the software application under test.

12. The system of claim 10, wherein the test is received at a user interface.

13. The system of claim 10, wherein the plurality of test parameters include at least one of a duration of latency, a rule for packet filtering, a port, a flag, a payload, a Medial Access Control (MAC) address, a version, an identification, a protocol type, a Transmission Control Protocol (TCP) option, a Time-To-Live (TTL), a checksum, and a source or destination Internet Protocol (IP) address.

14. The system of claim 10, wherein the data packet is processed to induce a delay, reroute the data packet, or stress to the communication channel.

15. The system of claim 10, wherein the data packet is processed to modify a payload of the data packet.

16. The system of claim 10, wherein the data packet is processed to modify a checksum, a flag setting, a destination port or an IP address for the data packet.

17. The system of claim 10, wherein the software application under test is monitored for a change in a perceived user experience over a period of time.

18. The system of claim 10, wherein the testing computer application automatically executes an action in response to the monitoring of the software application under test, wherein the action may include allocating a system resource to the software application under test.

\* \* \* \* \*